(12) United States Patent
Yach et al.

(10) Patent No.: US 8,627,316 B2
(45) Date of Patent: *Jan. 7, 2014

(54) MOBILE COMMUNICATIONS DEVICE APPLICATION PROCESSING SYSTEM

(75) Inventors: David P. Yach, Waterloo (CA); John F. A. Dahms, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1263 days.

This patent is subject to a terminal disclaimer.

(21) Appl. No.: 12/372,233

(22) Filed: Feb. 17, 2009

(65) Prior Publication Data

US 2009/0210877 A1 Aug. 20, 2009

Related U.S. Application Data

(63) Continuation of application No. 10/479,388, filed as application No. PCT/CA02/00799 on May 30, 2002, now Pat. No. 7,493,616.

(60) Provisional application No. 60/294,331, filed on May 30, 2001.

(51) Int. Cl.
 *G06F 9/46* (2006.01)
 *G06F 15/173* (2006.01)

(52) U.S. Cl.
 USPC .......................................... 718/100; 709/224

(58) Field of Classification Search
 None
 See application file for complete search history.

(56) References Cited

U.S. PATENT DOCUMENTS

| | | | |
|---|---|---|---|
| 5,561,800 A | 10/1996 | Sabatella | |
| 5,613,120 A | 3/1997 | Palay et al. | |
| 5,916,308 A | 6/1999 | Duncan et al. | |
| 5,966,542 A | 10/1999 | Tock | |
| 5,966,702 A * | 10/1999 | Fresko et al. | 1/1 |
| 6,061,520 A | 5/2000 | Yellin et al. | |
| 6,110,226 A | 8/2000 | Bothner | |
| 6,112,304 A | 8/2000 | Clawson | |
| 6,199,196 B1 | 3/2001 | Madany et al. | |
| 6,230,184 B1 | 5/2001 | White et al. | |
| 6,260,187 B1 | 7/2001 | Cirne | |
| 6,295,643 B1 | 9/2001 | Brown et al. | |
| 6,330,709 B1 | 12/2001 | Johnson et al. | |

(Continued)

FOREIGN PATENT DOCUMENTS

| | | |
|---|---|---|
| CA | 2267477 | 3/1999 |
| EP | 1056013 A2 | 11/2000 |

(Continued)

OTHER PUBLICATIONS

International Search Report of Application No. PCT/CA02/00799, date of mailing Sep. 20, 2004—6 pgs.

(Continued)

*Primary Examiner* — Kenneth Tang
(74) *Attorney, Agent, or Firm* — Fish & Richardson P.C.

(57) ABSTRACT

A system and method of pre-linking classes for use by one or more applications. The system and method may also be used where the runtime processing is split between a host system and a target system. At the host system at least several classes are loaded and linked. At least one host-linked module is generated from the linked classes. The host-linked module is made available for use by the one or more applications operating on the target system.

80 Claims, 12 Drawing Sheets

(56) References Cited

U.S. PATENT DOCUMENTS

| | | | |
|---|---|---|---|
| 6,349,344 B1 | 2/2002 | Sauntry et al. | |
| 6,446,254 B1 | 9/2002 | Chapman et al. | |
| 6,453,467 B2 | 9/2002 | Madany et al. | |
| 6,493,870 B1 | 12/2002 | Madany et al. | |
| 6,654,954 B1 | 11/2003 | Hicks | |
| 6,658,492 B1 | 12/2003 | Kawahara et al. | |
| 6,745,386 B1 | 6/2004 | Yellin | |
| 6,810,519 B1 | 10/2004 | Hicks | |
| 6,983,460 B1* | 1/2006 | Goire et al. | 717/175 |
| 7,493,616 B2* | 2/2009 | Yach et al. | 718/100 |
| 2001/0001328 A1 | 5/2001 | Yoshida et al. | |
| 2002/0144011 A1 | 10/2002 | Hinsley | |
| 2004/0045019 A1* | 3/2004 | Bracha et al. | 719/332 |

FOREIGN PATENT DOCUMENTS

| | | |
|---|---|---|
| JP | 2000-155686 | 6/2000 |
| JP | 2001-51853 | 2/2001 |
| RU | 2108003 C1 | 3/1998 |
| RU | 2125344 C1 | 1/1999 |
| WO | 99/09724 | 2/1999 |
| WO | 99/51055 | 10/1999 |
| WO | 00/14631 | 3/2000 |

OTHER PUBLICATIONS

Office Action issued in Canadian Application No. 2,448,962 on May 31, 2005; 3 pages.
Office Action issued in Canadian Application No. 2,448,962 on Aug. 8, 2006; 6 pages.
Office Action issued in Canadian Application No. 2,448,962 on Sep. 26, 2007; 4 pages.
Notice of Allowance issued in Canadian Application No. 2,448,962 on Jan. 16, 2009; 1 page.
Office Action issued in Chinese Application No. 02815017.1 on Apr. 7, 2006; 21 pages.
Office Action issued in Chinese Application No. 02815017.1 on Nov. 24, 2006; 5 pages.
Notice of Allowance issued in Chinese Application No. 02815017.1 on May 11, 2007; 4 pages.
Communication Pursuant to Article 96(2) issued in European Application No. 02732274.2 on Aug. 4, 2005; 8 pages.
Communication Pursuant to Article 94(3) issued in European Application No. 02732274.2 on Dec. 27, 2007; 6 pages.
Communication under Rule 71(3) issued in European Application No. 02732274.2 on Apr. 8, 2010; 39 pages.
Extended European Search Report issued in European Application No. 10172732.9 on Sep. 27, 2010; 9 pages.
Communication Pursuant to Art. 94(3) issued in European Application No. 10172732.9 on Jan. 19, 2011; 6 pages.
Official Action issued in Japanese Application No. 2003-500735 on Nov. 7, 2006; 30 pages.
Official Action issued in Japanese Application No. 2003-500735 on May 31, 2007; 13 pages.
Office Action issued in Mexican Application No. PA/a/2003/010975 on Jun. 23, 2006; 2 pages.
Office Action issued in Mexican Application No. PA/a/2003/010975 on Oct. 26, 2007; 2 pages.
Notice of Allowanced issued in Mexican Application No. PA/a/2003/010975 on Feb. 21, 2008; 1 page.
Office Action issued in Mexican Application No. PA/a/2006/012933 on Jul. 28, 2008; 2 pages.
Office Action issued in Mexican Application No. PA/a/2006/012933 on Feb. 17, 2009; 2 pages.
Office Action issued in Mexican Application No. PA/a/2006/012933 on Jul. 24, 2009; pages.
Notice of Allowance issued in Mexican Application No. PA/a/2006/012933 on Jan. 22, 2010; 1 page.
Decision to Grant a Patent issued in Russian Application No. 2003134647 on Oct. 23, 2006; 8 pages.
Office Action issued in U.S. Appl. No. 10/479,388 on Jan. 29, 2007; 21 pages.
Office Action issued in U.S. Appl. No. 10/479,388 on Jul. 13, 2007; 20 pages.
Office Action issued in U.S. Appl. No. 10/479,388 on Dec. 12, 2007; 20 pages.
Office Action issued in U.S. Appl. No. 10/479,388 on Jun. 26, 2008; 20 pages.
Notice of Allowance issued in U.S. Appl. No. 10/479,388 on Oct. 7, 2008; 26 pages.
International Preliminary Examination Report issued in International Application No. PCT/CA02/00799 on Dec. 14, 2004; 3 pages.
Communication Pursuant to Art. 94(3) issued in European Application No. 10172732.9 on Oct. 4, 2012; 4 pages.
Office Action issued in Russian Application No. 2003134647 on Dec. 2005.

* cited by examiner

MOBILE COMMUNICATIONS DEVICE APPLICATION PROCESSING SYSTEM

RELATED APPLICATION

This application claims priority to U.S. provisional application Ser. No. 60/294,331 entitled "Method Of Splitting A Processing Machine Runtime Between A Host System And A Target System" filed May 30, 2001. By this reference, the full disclosure, including the drawings, of U.S. provisional application Ser. No. 60/294,331 is incorporated herein.

This application is a continuation of U.S. patent application Ser. No. 10/479,388 entitled "Mobile Communications Device Application Processing System" filed on Nov. 26, 2003, granted as U.S. Pat. No. 7,493,616, the entirety of which is herein incorporated by reference.

BACKGROUND

This invention relates to the field of processing machine runtime environments. In particular, this invention relates to a method of splitting a processing machine runtime between a host system and a target system for conserving resources at the target system.

Currently, the state of the art virtual machine is the Java™ virtual machine (JVM) from Sun Microsystems, Inc. (Sun). At the centre of Sun Microsystems Java™ technology is their Java™ virtual machine code, or byte code, as currently specified by the class file format in chapter 4 of the second edition of The Java™ Virtual Machine Specification by Tim Lindholm and Frank Yellin, Addison-Wesley Pub Co; ISBN: 0201432943.

Class file byte code co-operates with Sun's Java™ Runtime Environment (JRE) on the Solaris™, Win32, Linux™, Mac, and possibly other platforms. Typically, source code written in the Java™ programming language, is compiled into virtual machine byte code respecting the class file format by using a Java™ compiler, such as "javac", and then executed using the JRE or a compatible runtime environment and processing machine.

In reference to FIG. 1, d layered JRE architecture block diagram illustrates several aspects of the Sun technique. Various mechanisms (100A and 100B) provide program software (110A and 110B) byte code class files. For instance, a compiler 100A compiles software 110A into byte code class files. Alternatively, a web browser may use a software "plugin" 110B to download software 100B byte code class files.

Byte code in a class file usually references several other classes, each of which has a class file. For that reason, standard package 120 class files are provided as a shared software resource to be re-used by instances of software (110A and 110B). The JVM 140 obtains class files and executes software (110A and 110B) and standard package class files 120.

Also shown are the various systems 130 on top of which the JRE 142 operates. The standard packages in a runtime define a particular runtime platform specified in an application programmer's interface (API).

The Java™ 2 Standard Edition (J2SE) is a Sun reference platform API. They also provide a reference implementation comprising a JRE configured with a set of standard packages running on the JVM. Application developers can write applications in the Java™ programming language referring to the J2SE standard package classes and may expect to have their applications run on J2SE compliant runtime systems. Other platforms exist which are usually defined by comparison to the J2SE. For instance, a superset of J2SE, the Java™ 2 Enterprise Edition (J2EE) adds further features. Of particular interest is a subset of J2SE, the Java™ 2 Micro Edition (J2ME).

Although the J2SE platform may be well suited to operate on systems such as those illustrated by the Solaris™, Win32, Mac, Linux™, and other blocks 130 of FIG. 1, J2SE may not be well suited for operating on many devices. For instance, the class files of the standard J2SE packages may presently consume well over 16 Megabytes of disk space, which may exceed the storage capacity of many devices.

To address this problem, Sun introduced the Java™ 2 Micro Edition (J2ME) platform, additional virtual machines, and associated device configurations.

The Connected Limited Device Configuration (CLDC) and K Virtual Machine (KVM) address small consumer devices that you hold in your hand, with 128K to 512K of memory, and when used with the Mobile Information Device Profile (MIDP) may provide an application environment for devices such as cell phones and two-way pagers.

The Connected Device Configuration (CDC) and C Virtual Machine (CVM) address emerging, next-generation consumer devices with 2 MB or more of memory, and when used with the Foundation Profile (FP) may provide an application environment for next-generation consumer devices.

An advantage of J2ME is that when it is used with the aforementioned CLDC or CDC configurations, fewer standard class packages are stored on many devices as compared to J2SE. Therefore J2ME may take up less space on a device at the expense of not supporting all of the features of J2SE.

Although Java™ runtime technology may be available for different systems and devices, and although the J2ME platform addresses the limited storage space problem of devices by removing functionality, J2ME may not be considered an adequate solution since it may not address the efficiency of a device runtime implementation. Thus, there is a need for a runtime that is optimized for a target device (as well as other needs).

In order to better understand the present invention, the following information regarding Java runtime technology is provided. According to Lindholm et al., in section §2.17.1 of the Sun JVM spec: "The Java virtual machine starts execution by invoking the method main of some specified class and passing it a single argument, which is an array of strings. This causes the specified class to be loaded (§2.17.2), linked (§2.17.3) to other types that it uses, and initialized (§2.17.4)". Therefore by specifying the name of a "main" class when starting the JVM 140 of FIG. 1, a class file will be loaded and execution of byte code instructions will begin at the static main entry point of that class file. Furthermore, referenced types, such as classes, used by the "main" class will be linked and initialized. Depending on the use of other classes by the "main" class file, significant runtime resources will be consumed in order to load and link used class files.

Java™ runtime technology requires that the runtime system load and link all required class files each time a "main" class is specified for execution, which may cause the precipitous consumption of resources on a target system such as a device.

A typical Java™ application has at least one "main" class file containing a static main entry point, as well as possibly having several supporting class files.

The following example Java™ program listing is considered next:

```
public class Hello {
    public static void main(String[ ] a) {
        System.out.println("Hello!");
        Bye.bye(a);
    }
}
public class Bye {
    public static void bye(String[ ] a) {
        System.out.println("Bye!");
    }
}
```

The above listing provides source code for two classes, Hello and Bye, each of which can be compiled into class file format in a way which is known to a person skilled in the art, such as by placing the source for each class in a Hello.java file and a Bye.java file and using the command "javac Hello.java Bye.java" to obtain a Hello.class file and Bye.class file.

The Hello class provides a static main entry point and is therefore suitable to be specified as a "main" class when starting the JVM 140.

In reference to FIG. 2, the linking technique of the runtime of FIG. 1 is considered in reference to the above example "Hello" program. A plurality of class files 200 is available to the virtual machine 140 (of FIG. 1). Each class file has symbolic information that is used by the virtual machine 140 to resolve references to other used class files.

Typically, the Hello.class file 210A is loaded at 220A first as it is specified when starting the JVM 140. The JVM 140 then proceeds to execute byte code instructions at the main entry point of the loaded class 220A. Since the Hello class 220A uses several standard package classes, the class files for the used classes will be loaded and linked to the Hello class 220A. The Object.class file 210B will be loaded at 220B and linked 230B to the 210A Hello class. Similarly, the String.class file 210C, System.class file 210D, and other class files 210 used by the Hello class are loaded at 220C, 220D, 220 and linked at 230C, 230D, and 230. The Hello class also uses the Bye class (a supporting class which is not a standard package class) so the Bye.class file 210E will be loaded at 220E and linked at 230E.

Although not expressly shown in the drawings, each time a class file 210 is loaded at 220 and linked at 230, any class files the loaded class 220 uses might also be loaded and linked. For instance, in the case of the loaded supporting Bye class 220E, it uses many of the same classes as the Hello class 210A. Depending on when the Bye class 220E is loaded and linked 230E, the Bye class 220E may not have to load the class files 210 that are common with classes also used and loaded by the Hello class. However, all classes used by Bye 220A will ultimately have to be linked to Bye as well for Hello to be able to use the supporting Bye class. The situation is similar with standard package classes.

Traditional class file 210 loading (at 220) and linking (at 230) consume significant runtime resources and may slow down the execution of a "main" program 220A when loading and linking of class files is triggered by the specification of a command to execute a program, as will be discussed further next in reference to FIGS. 3A and 3B.

With reference to FIGS. 3A and 3B, a flowchart further illustrating the runtime linking technique of FIG. 2, particularly illustrating optional late resolution, is discussed. The "main" class is loaded at 310 from class storage 200, such as a hard drive or a network. The class is verified and prepared at 315. If late resolution is not used as determined at 320, then all used classes are linked and loaded at 325. Regardless of whether late resolution is used at 320 or not, the "main" class is initialized at 330.

Instructions from the main entry point are fetched at 335. If the fetched instruction does not involve an unresolved reference as determined at 340, the fetched instruction is executed at 345. However if the fetched instruction involves an unresolved identifier reference as determined at 340, such as a class reference to a class that has not yet been loaded, then if late resolution is not used as determined at 350, an exception is thrown in the runtime. If late resolution is used as determined at 350, and if the referenced class cannot be loaded at 355, an exception is thrown in the runtime. However, if late resolution is used as determined at 350, and the referenced class can be loaded, the referenced class is loaded and the reference is resolved at 360 prior to executing the instruction at 345. If there are more instructions to execute as determined at 365, then the next instruction is fetched at 335, or else the virtual machine ends.

If late resolution were used, then several class files would have been loaded and linked at 360 during execution of the main program byte code. Alternatively, if late resolution were not used, several class files would have been loaded and linked at 325 prior to executing the main program byte code, after specifying the "main" class file to the JVM 140. In either case, a precipitous consumption of resources for loading and linking may ensue between the time the main program was specified for execution by the JVM 140 in the runtime and the time when the main program either terminated or threw an exception.

Therefore, even by eliminating late resolution, there is a potential risk for a precipitous consumption of resources for loading and linking class files in execution triggered linking and loading.

SUMMARY

The present invention overcomes the problems noted above as well as others. In accordance with the teachings of the present invention, a system and method are provided for pre-linking classes for use by one or more applications. The system and method may also be used where the runtime processing is split between a host system and a target system. At the host system at least several classes are loaded and linked. At least one host-linked module is generated from the linked classes. The host-linked module is made available for use by the one or more applications operating on the target system.

BRIEF DESCRIPTION OF THE DRAWINGS

In order that the invention may be more clearly understood, embodiments thereof will now be described in detail by way of example only, with reference to the accompanying drawings, in which.

The same reference numerals are used In different figures to refer to similar elements.

DETAILED DESCRIPTION

Figure 1:
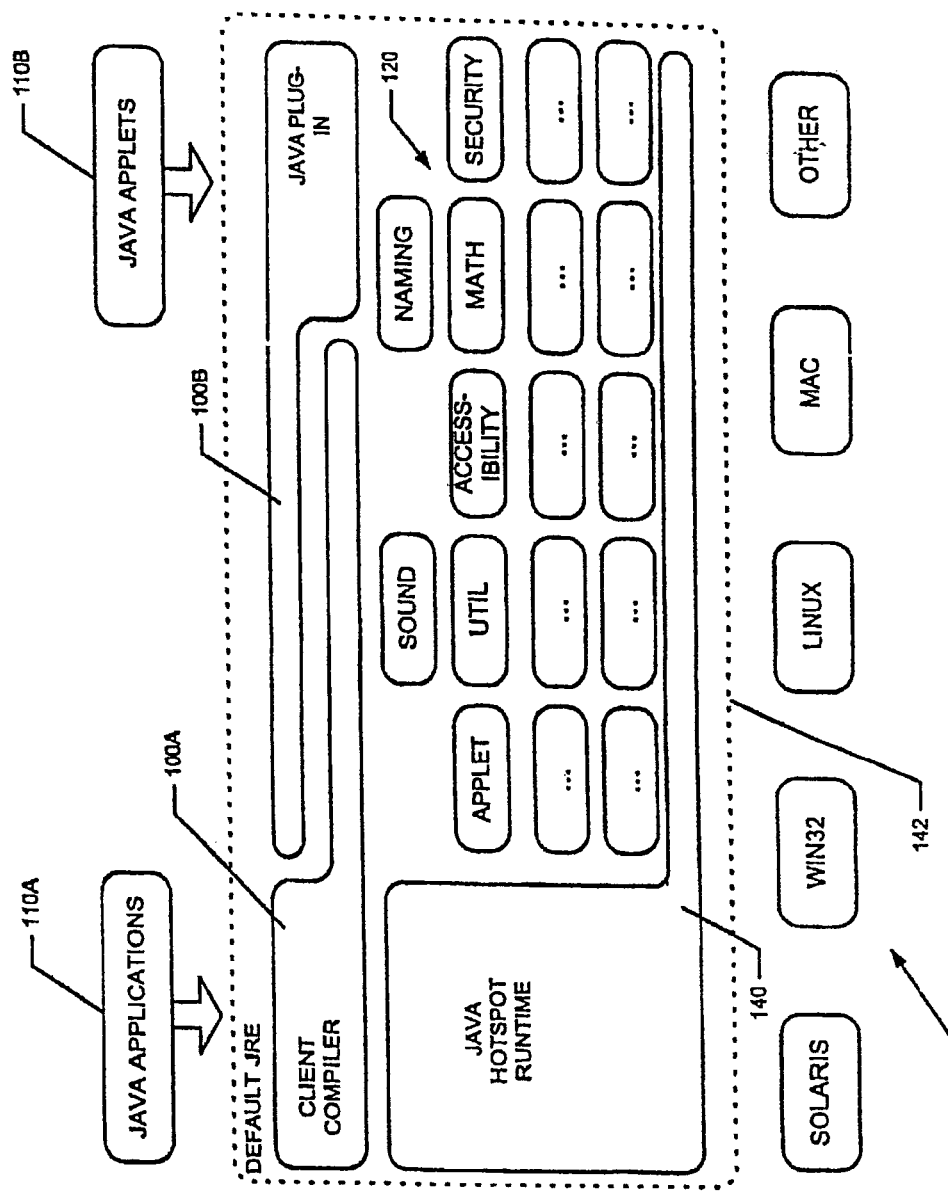
FIG. 1 is a block diagram illustrating a prior art runtime technique.
Figure 2:
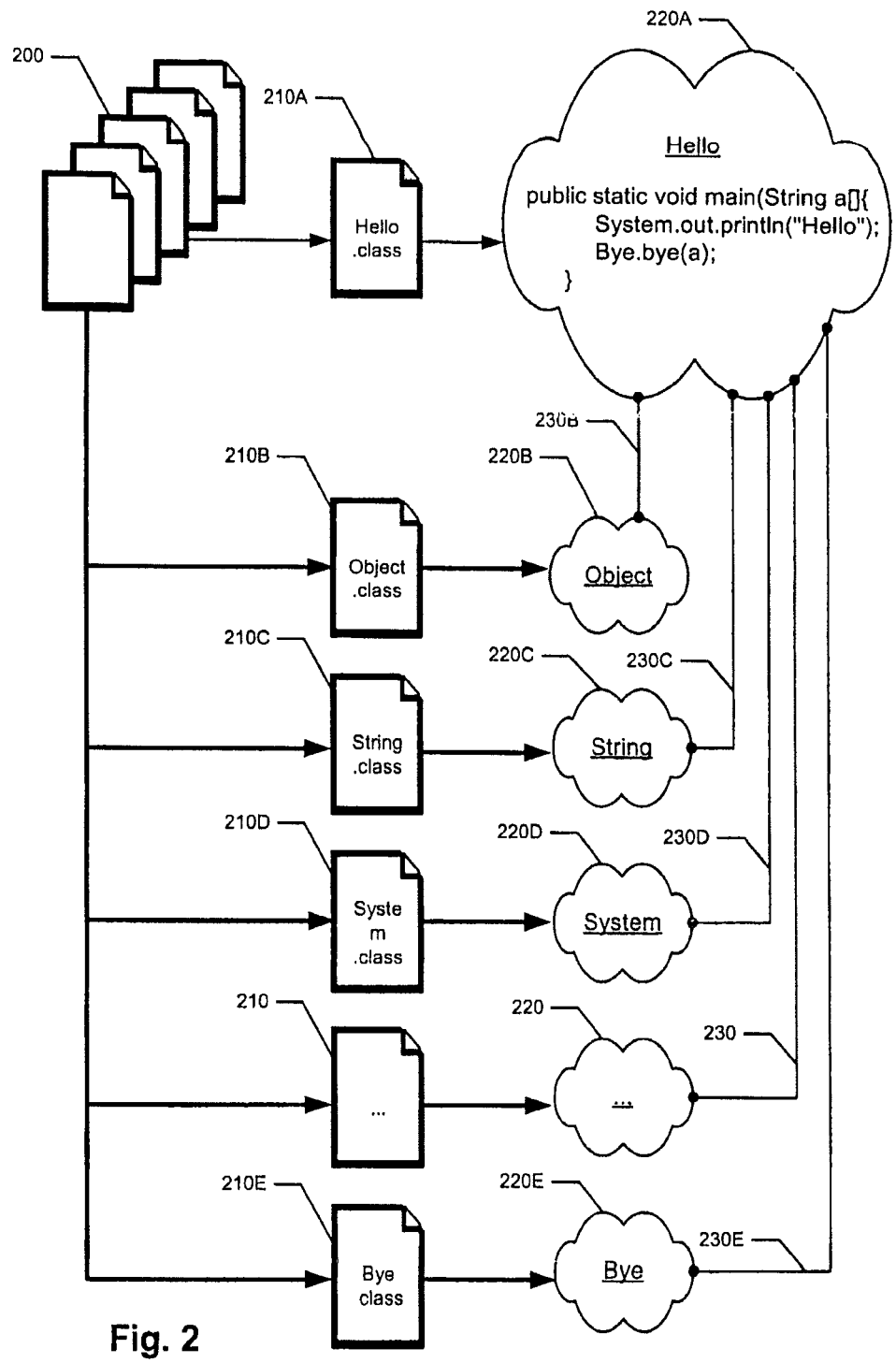
FIG. 2 is a block diagram illustrating a linking technique of the runtime of FIG. 1.
Figure 3A:
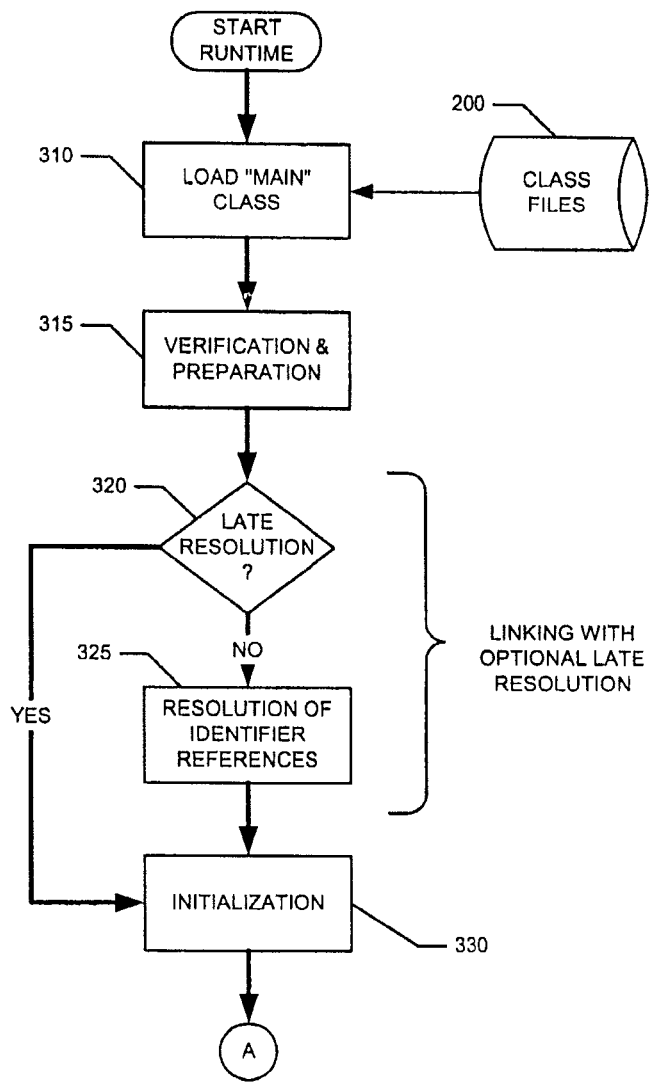
FIGS. 3A and 3B are flowcharts further illustrating the runtime linking technique of FIG. 2, particularly illustrating optional late resolution.
Figure 3B:
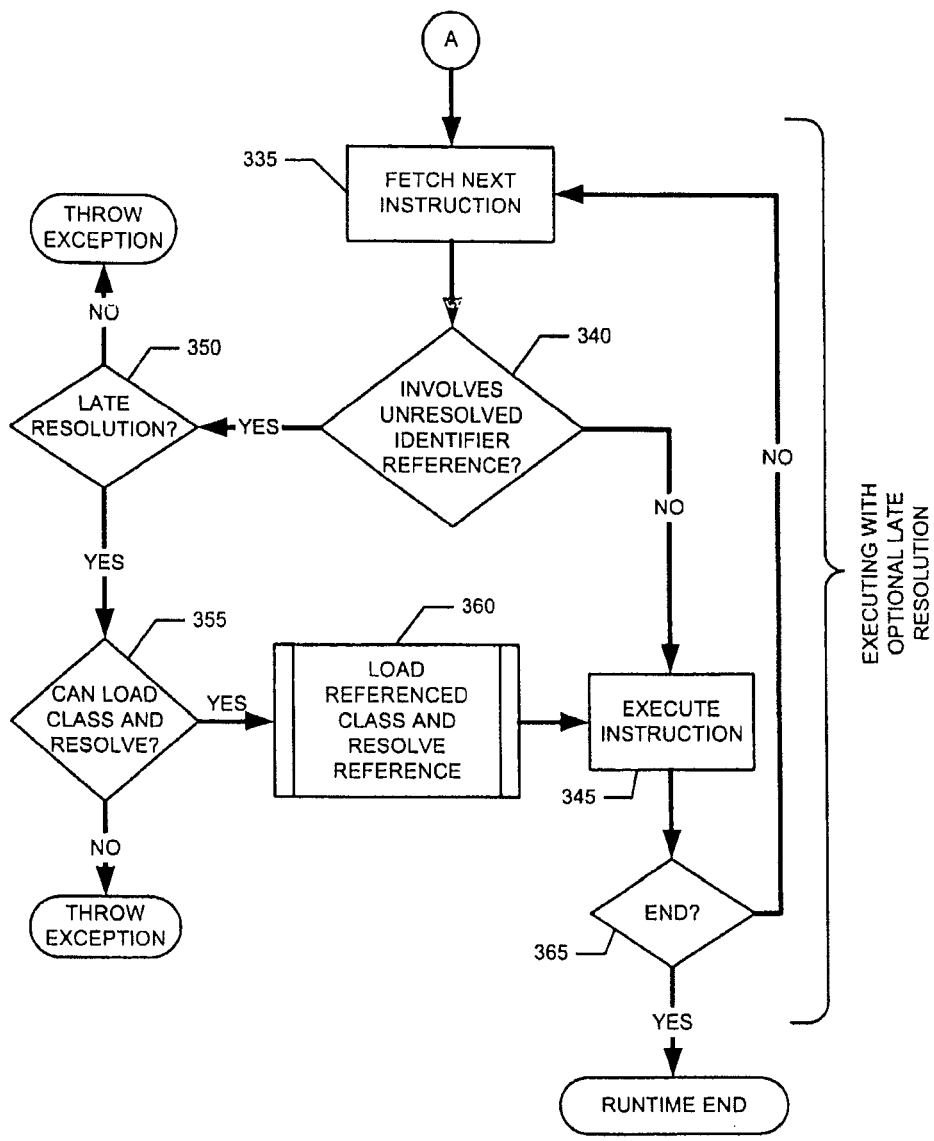
Figure 4:
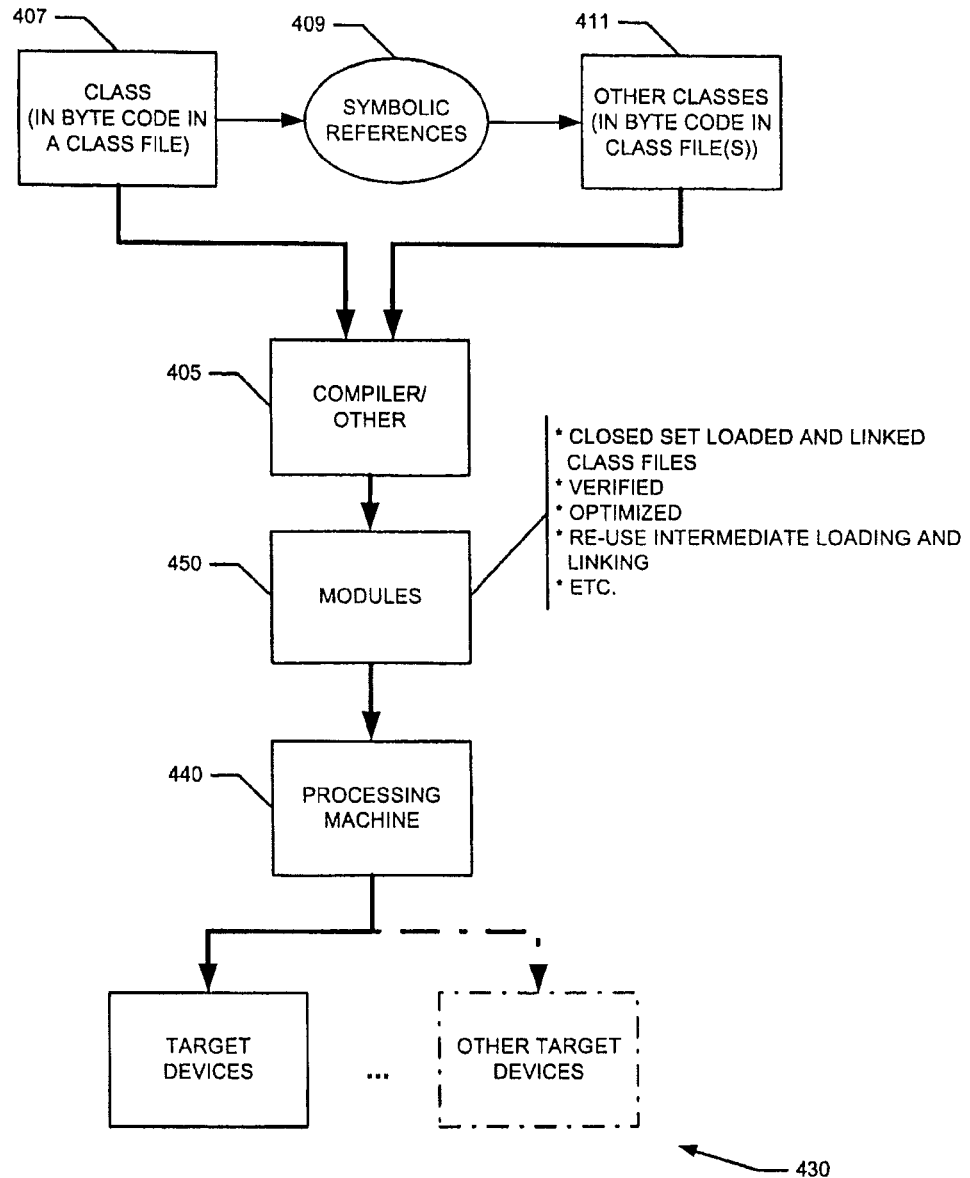
FIGS. 4 and 5 are block diagrams illustrating an exemplary split runtime system.

FIG. 4 depicts an embodiment of a module-based runtime system. Instead of unlinked class files, a processing machine 440 executes modules 450 that include classes that have already been loaded and linked. More specifically, the modules 450 comprise the information found in closed set loaded and linked class files, thereby optimizing commands, symbolic information, and code size and sped for the target processing machine 440. Modules 450 allow the runtime to re-use the intermediate loading and linking work in multiple executions of main programs, instead of repeating this work at every execution. Modules 450 provide an alternative to execution triggered loading and linking.

A compiler (or other mechanism) 405 receives a class file 407 which include symbolic references 409 to other classes 411. The compiler 405 processes class files 407 and 411 which are in byte code such that the symbolic references 409 are resolved. The processed class files are provided to the processing machine 440 as modules 450. The processing machine 440 operates more efficiently on target devices 430 since typically the module size is substantially smaller than traditional runtime class files, for example, there may be a reduction approximately eight-fold in comparison to Java class file size. Also, module code can be verified once using sanity checks prior to multiple executions, thereby increasing subsequent execution speeds. Modules can be configured to minimize code communication, particularly useful in communication bandwidth-limited devices. Modules 450 can be configured to minimize code set up and execution time, particularly useful in runtime resource-limited devices. Modules 450 can be adapted to existing processing machine runtimes while maintaining compatibility with reference APIs, as FIG. 5 illustrates.

Figure 5:
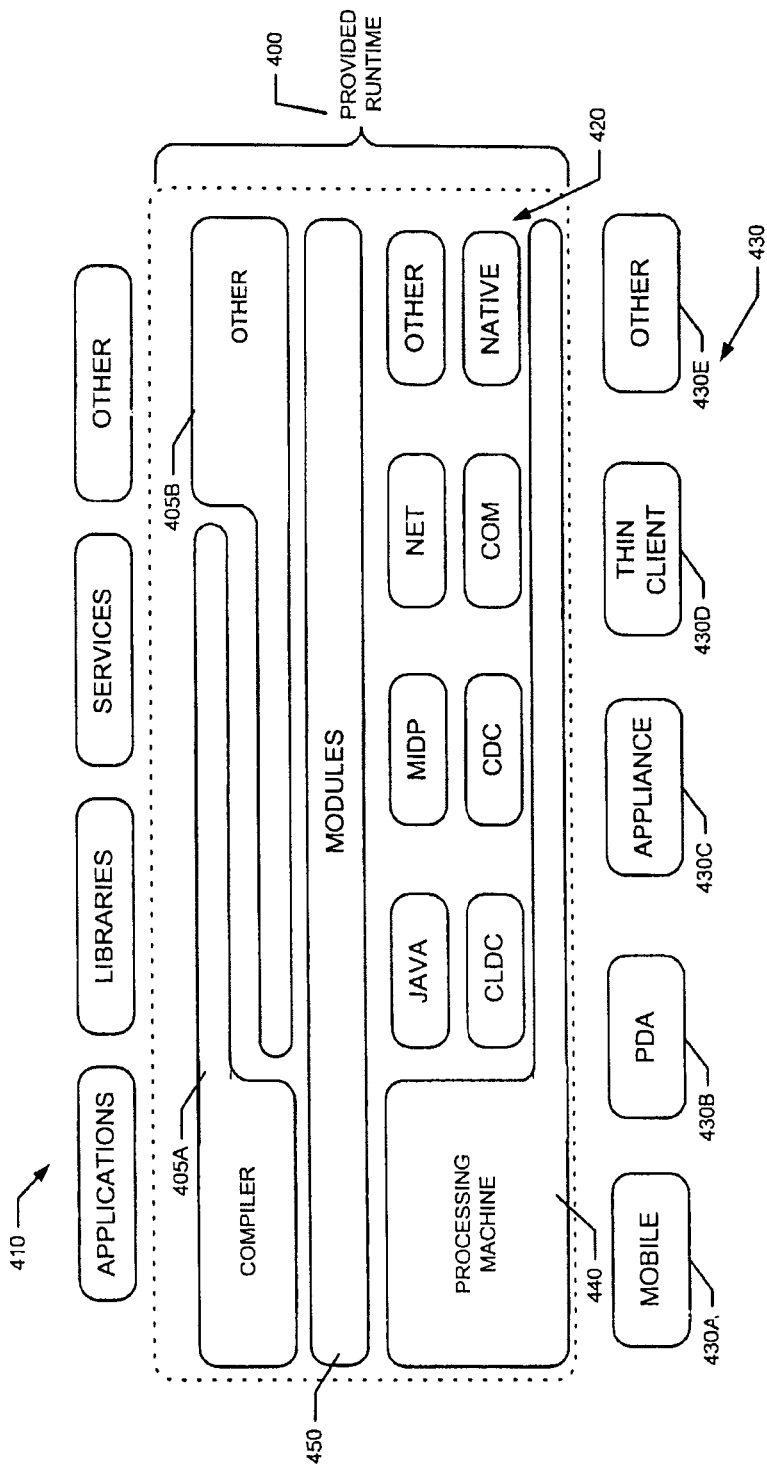

FIG. 5 illustrates an embodiment wherein various mechanisms 405A and 405B provide software 410. A compiler 405A compiles software 410. Alternatively, other mechanisms 405B can be used to download or otherwise obtain software 410. Standard class packages 420 are provided as a shared software resource to be re-used by instances of software 410. The processing machine 440 obtains classes and executes software 410 using standard class packages 420.

Also shown are the various target devices 430 on top of which the processing machine 440 operates, such as a mobile device 430A, a personal data assistant (PDA) 430B, an appliance 430C, a thin client 430D, or other device 430E.

In FIG. 5, modules 450 have been introduced between the mechanism that provides software 410 and the processing machine 440 that executes machine code. The processing machine 440 however still uses the classes in the provided software 410 as well as the standard class packages 420, except that this is now done through the use of modules 450 rather than directly using class files. Class files can still be used as the compiler can take both class files and source files on its input and produce modules on its output.

Because of the presence of modules 450, the processing machine 440 need not be a virtual machine nor even know about the class file format, thereby optimizing performance at the target system by eliminating the need to load, link, and resolve class files. Further optimizations are possible if the provided runtime is split between a host system and a target device 430, as described in reference to FIG. 6.

Figure 6:
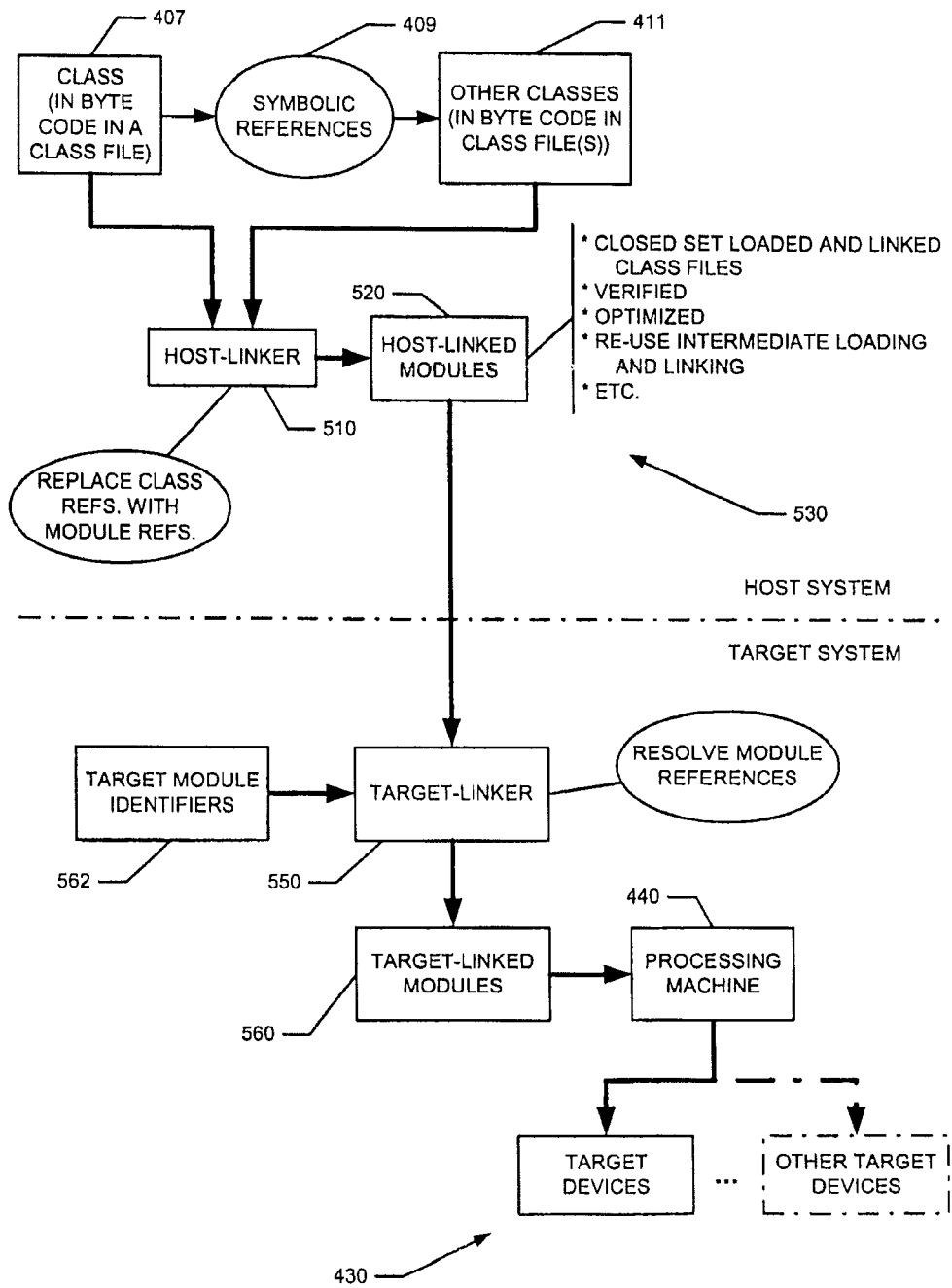
FIGS. 6 and 7 are block diagrams illustrating different exemplary split runtime systems.

FIG. 6 illustrates a split embodiment of a module-based runtime system. The class runtime processing is split between a host system 530 and a target system 430. The use of modules allow the runtime to be efficiently split between a host system and target device to optimize runtime efficiency at the target device.

In the host system split runtime, class files (407 and 411) are host-linked at 510 into host-linked modules 520. The work of closed class file set analysis is offloaded to the host system 530. In the target system split runtime, host-linked modules 520 are communicated at 540 from the host system 530, to be target-linked at 550 into target-linked modules 560. If any additional class resolution is needed on the target system 430, then the additionally needed target module identifiers 562 are target-linked at 550 with the host-linked modules 520 to form the target-linked modules 560. The processing machine 440 executes the target-linked modules 560.

Figure 7:
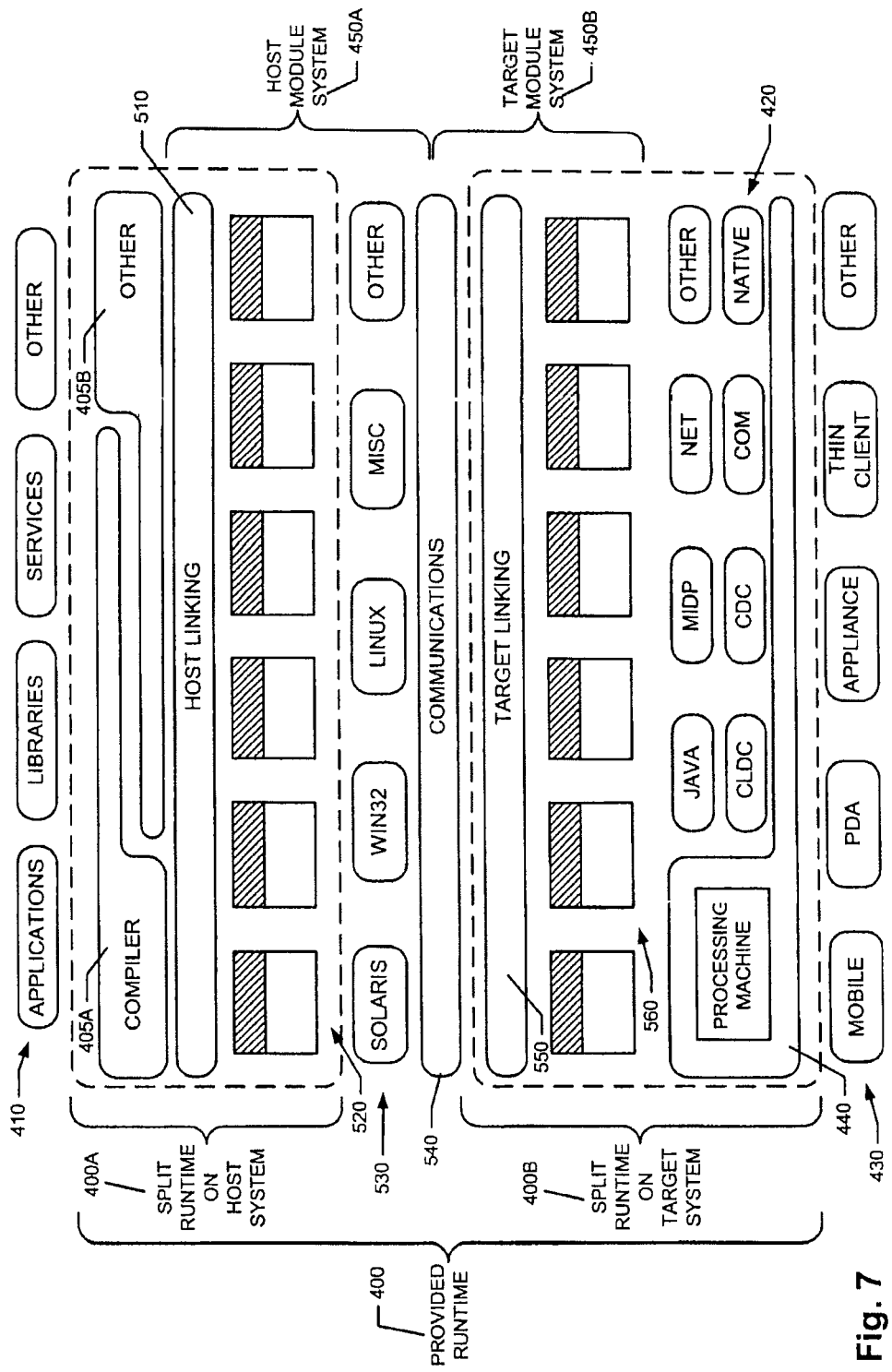

FIG. 7 is a block diagram illustrating another split runtime system. For the host system 530, class files 410 are host-linked at 510 into host-linked modules 520. For this system, the details of host linking will be discussed further in reference to FIGS. 8, 9 and 10 below. For the target system 430, host-linked modules 520 are communicated at 540 from the host system 530, to be target-linked 550 into target-linked modules 560. The communication 540 between host and target may occur over any medium so that the module(s) may be provided to the target, such as through a mobile communications network if the target is a mobile communications device, or through a data signal embodied in a carrier signal. The details of target linking will be discussed further in reference to FIGS. 8, 9 and 11 below.

Figure 8:
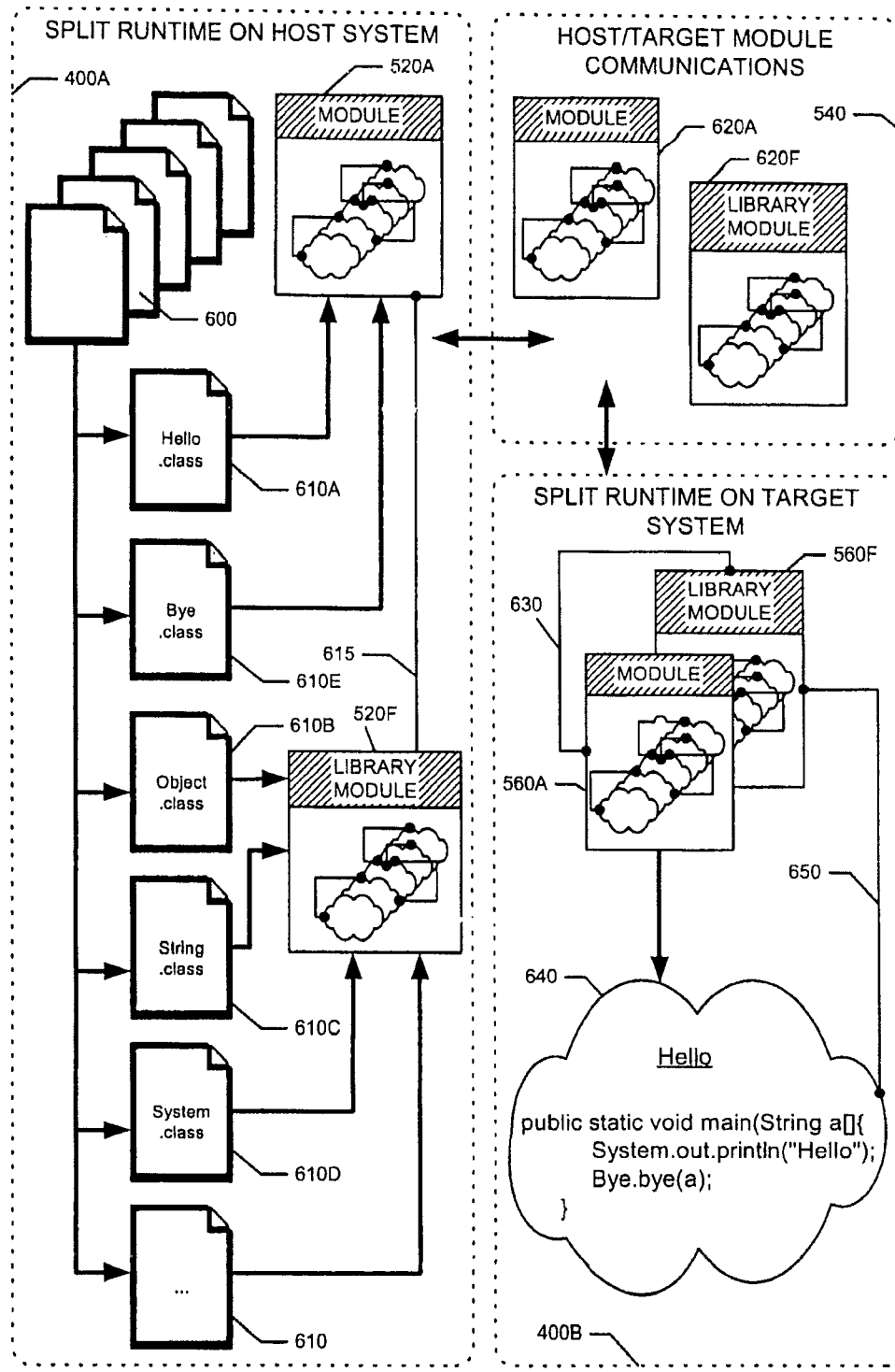
FIG. 8 is a block diagram illustrating a linking technique for a split runtime system.

In reference to FIG. 8, a block diagram illustrating the loading of class files, and the split linking into modules, and execution of the split module runtime of FIGS. 6 and 7 is described presently. The work of closed class file set analysis is offloaded into a host system 400A. There, class files 600 are loaded at 610 and linked into host-linked modules 520A and 520F. Illustrated are an application module for the example "Hello" module 520A comprising the optimized information found in the Hello.class file 610A and Bye.class file 610E wherein the Hello class is pre-linked to the Bye class. Module 520A also has a symbolic reference 615 to a Library module 520F which comprises all of the standard package classes that the Hello and Bye classes use, such as the classes provided by the Object class file 610B, String class file 610C, System class file 610D, and other class files 610. The Library module 520F could export all public symbols so that many different "main" classes such as Hello can re-use all of the standard class package files. Alternatively, the Library module could comprise only those class files used by the Hello and Bye classes, or even all used classes could be included directly in module 520A. The latter case would eliminate the need for any symbol resolution on the target system.

When at least one host-linked module (520A and/or 520F) is available, it is possible to communicate at 540 the candidate module 620A and 620F to the split runtime on the target system 400B. Once the candidate modules (620A and 602F) are received on the target system, it is target-linked into a target-linked module 560A and 560F and any module symbolic references 615 are resolved as shown at 630. A main module class can be specified for execution, such as the Hello class 640. However, advantageously, each time the main program of the Hello class executes, there is no need to resolve reference 650 as the target-linking 630 provides it.

Figure 9:
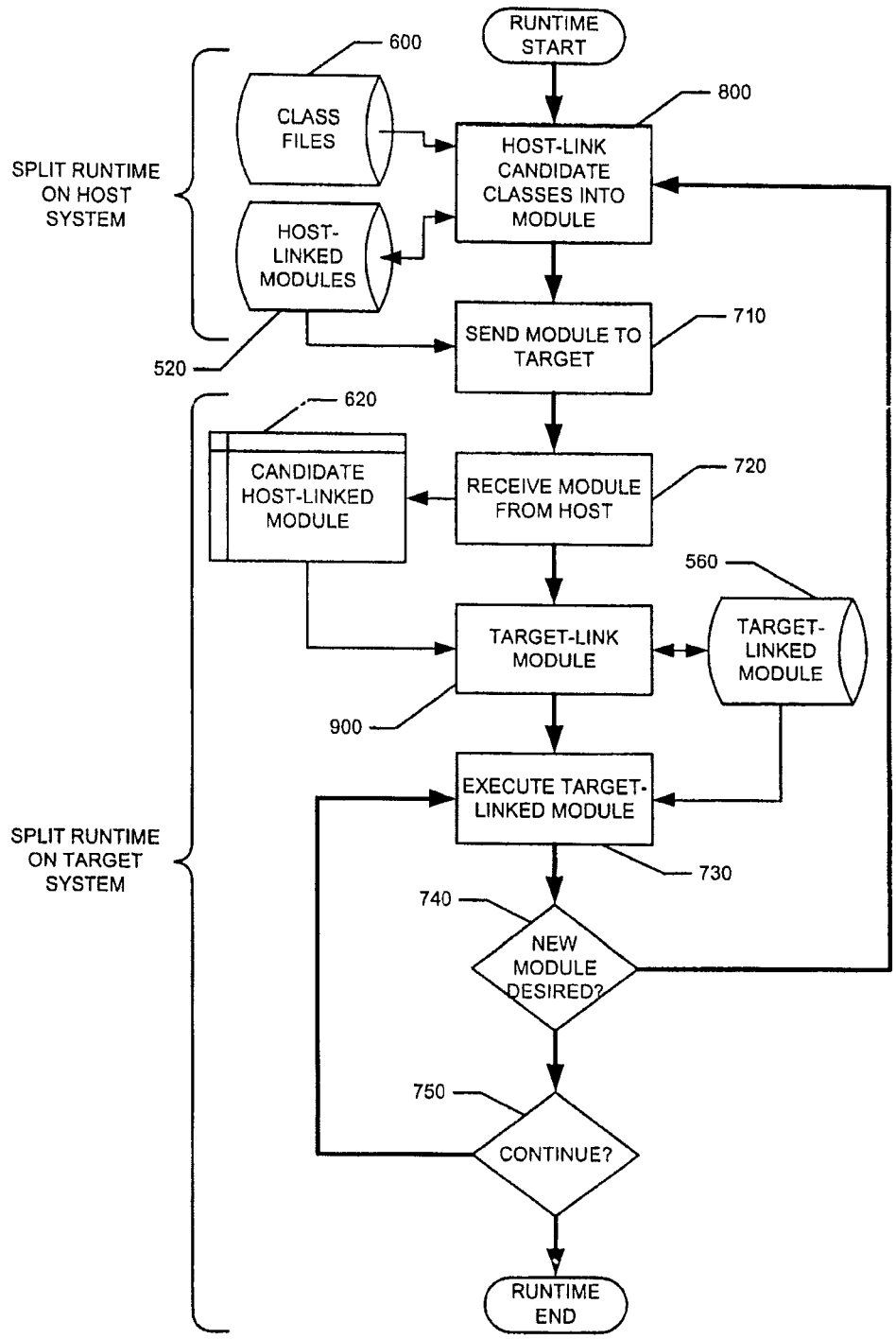
FIG. 9 is a flowchart further illustrating the linking technique of FIG. 8, introducing a host-linking step and a target-linking step.

With reference to FIG. 9, a flowchart further illustrating the linking technique of FIG. 8, depicting a host-linking step and a target-linking step, is described. In the split runtime system on the host, classes 600 are loaded and host-linked at 800 into host linked modules 520. Then, at least one host-linked module 520 is sent to the split runtime system on the target.

In the split runtime system on the target, at least one candidate host-linked module 620 is received at 720 from the host. The candidate host-linked module 620 is target-linked at 900 into a target-linked module 560. At least one target-linked module 560 is executed at 730. If a new module is desired as determined at 740, the host-linking process 800, communications processes (710 and 720) and target linking process 900 cycles may ensue. However, if no new modules are desired, then repeated execution at 730 of target-linked modules can ensue without the overhead of loading and linking.

Figure 10:
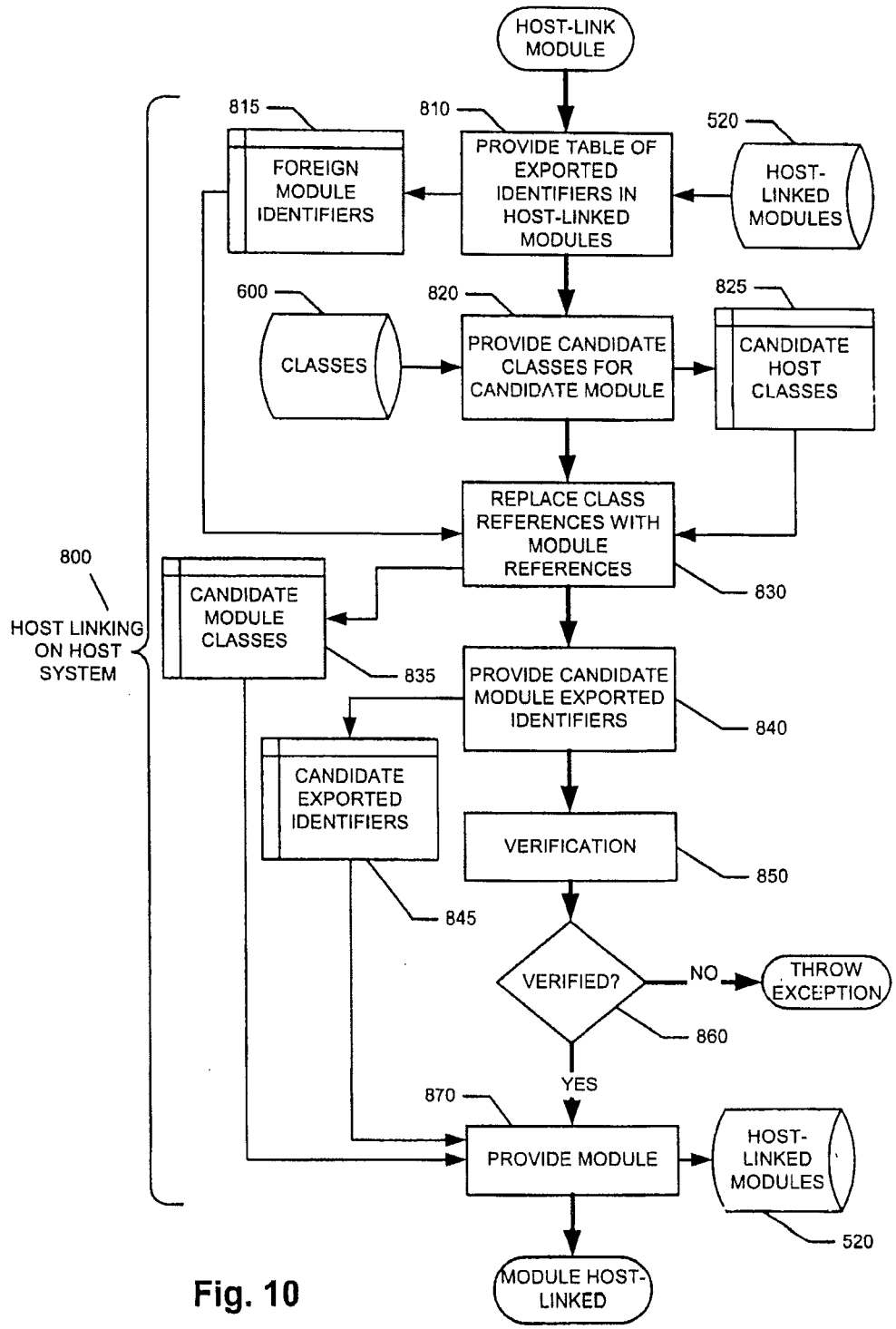
FIG. 10 is a flowchart further illustrating the host-linking step of FIG. 9.

In reference to FIG. 10, a flowchart further illustrating the host-linking step of FIG. 9 is described. In the split runtime system on the host, host linked modules 520 exported symbols provide at 810 foreign module identifiers 815. Also, classes 600 provide at 820 candidate host classes 825. Class references in the candidate host classes 825 are replaced at 830 with module references using foreign module identifiers 815, thereby providing closed set candidate module classes 835. Then, candidate module exported identifiers 845 are provided at 840, The candidate module classes 835 and exported identifiers 845 are then verified at 850. If verified as determined at 860, then the candidate host-linked module is provided at 870 as a host-linked module 520. If not verified as determined at 860, an exception is thrown.

Figure 11:
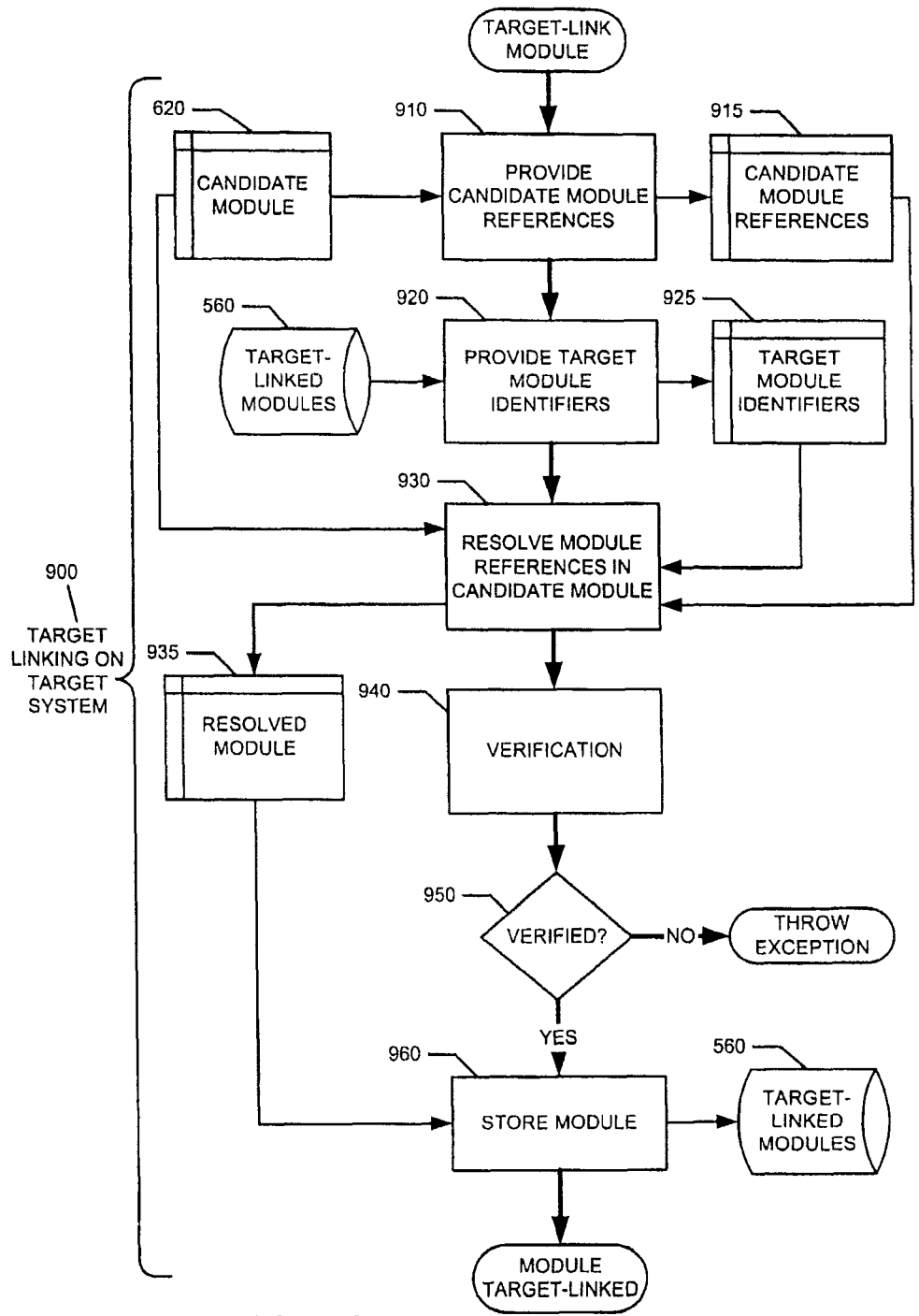
FIG. 11 is a flowchart further illustrating the target-linking step of FIG. 9.

In reference to FIG. 11, a flowchart further illustrating the target-linking step of FIG. 9 is described. In the split runtime system on the device, the received candidate module 620 provides at 910 candidate module references 915. Also, target-linked modules 560 provides at 920 target module identifiers 925. Next, resolution of module references in the candidate module provides at 930 a resolved module 935. The resolved module 935 is verified at 940, and if the resolved module 935 is verified successfully as determined at 950, then the resolved module 935 is stored at 960 with other target-linked modules 560. However, if the resolved module 935 is not verified successfully as determined by 950, an exception is thrown.

Having described in detail the preferred embodiments of the present invention, including preferred modes of operation, it is to be understood that this invention and operation could be constructed and carried out with different elements and steps. The embodiments are presented only by way of example and are not meant to limit the scope of the system and method of the present invention, which is defined by the claims.

To illustrate the wide scope of the system and method, the following is provided. Virtual machine code is usually interpreted by software. However, a virtual machine code processor can be implemented in hardware. Adaptation of the system and method to a hardware processing machine runtime is within the scope of the invention. As additional examples of the wide scope of the system and method, the system and method may allow for the optimization of commands, symbolic information, and code through the use of the system's and method's modules. The system and method may allow for a module size that is substantially smaller than traditional runtime class file, for instance by reducing in some cases by eight-fold the module size in comparison to Java class file size without losing functionality. The system and method may provide that module code can be verified using sanity checks once prior to multiple executions.

The system and method may also allow a module to combine only new classes to minimize module storage size and allow for efficient module delivery to communication bandwidth-limited devices. As another example of the wide scope of the system and method, the system and method can combine all required classes to minimize code set up and execution time in resource-limited devices. The system and method may be adapted to existing processing machine runtimes while maintaining compatibility with reference APIs. The system and method may provide that modules can be dynamically linked together while minimizing the number of symbolic references, Still further, the system and method may provide that code in modules can be executed directly from storage on a device, unlike class files that have to be loaded from storage prior to execution.

The invention claimed is:

1. A system, comprising:
a host system, configured to split class run-time processing between the host system and a target mobile communication device including transmitting to the target mobile communication device over a network connection, a pre-linked module, including a plurality of classes that have been loaded and pre-linked; and
a target mobile communication device, including an application, and configured to:
receive the pre-linked module; and
link the pre-linked module into a target-linked module;
the application having access to the target-linked module to use the pre-linked classes during the application's execution.

2. The system of claim 1 wherein the application operates upon the target mobile communication device;
wherein the network connection comprises a mobile communication network for providing the pre-linked module for use by the application.

3. The system of claim 2 wherein the target mobile communication device includes target-linking means for target-linking the pre-linked module with other modules for use by the application.

4. The system of claim 1 wherein the pre-linked module substantially optimizes commands, symbolic information, and code;
wherein the symbolic information in the pre-linked module has been resolved.

5. The system of claim 1 wherein the classes include symbolic information.

6. The system of claim 1 wherein the pre-linked module is verified.

7. The system of claim 1 wherein the pre-linked module comprises a plurality of modules that contain all classes needed by the application.

8. The system of claim 1 wherein the application is operative on the target device, wherein the pre-linked module is directly executable from a processor-readable memory on the device.

9. The system of claim 8 wherein the pre-linked module provides re-use of loading and linking steps in executions of multiple applications operating on the device.

10. The system of claim 1 wherein the pre-linked module is generated prior to execution of the application.

11. The system of claim 1 wherein the pre-linked module is configured based upon code set up at execution time.

12. The system of claim 1 wherein the application operates upon a bandwidth-limited device.

13. The system of claim 1 wherein the application operates upon a mobile data device.

14. The system of claim 1 wherein the application operates upon a personal data assistant.

15. The system of claim 1 wherein the application operates upon a wireless mobile communication device.

16. The system of claim 1 wherein the application operates upon a thin client application.

17. The system of claim 1 wherein said plurality of classes comprise Java-based classes.

18. A method of host-linking classes at a host system, comprising:
    loading at the host system at least several classes;
    linking at the host system the loaded classes;
    forming at least one host-linked module from the linked classes;
    storing at the host system said host-linked module in a processor-readable memory; and
    splitting class run-time processing between the host system and a target system including providing multiple pre-linked classes over a network connection for use the target system for linking into a target-linked module.

19. The method of claim 18 wherein a services application provides at least one of the classes to be used in said loading step at the host system.

20. The method of claim 18 wherein a software library provides at least one of the classes to be used in said loading step at the host system.

21. The method of claim 18 wherein a Java application provides at least one of the classes to be used in said loading step at the host system.

22. The method of claim 18 wherein the linking of the loaded classes at the host system substantially optimizes commands, symbolic information, and code.

23. The method of claim 18 wherein the classes comprise symbolic information.

24. The method of claim 18 further comprising the step of: verifying at the host system the host-linked module using sanity checks.

25. The method of claim 18 further comprising the step of: verifying at the host system the host-linked module using sanity checks once prior to multiple executions of the target-linked module on the target system.

26. The method of claim 18 wherein the host-linked module comprises a plurality of modules that contain all classes needed by an application having access to the target-linked module.

27. The method of claim 18 wherein the target-linked module is directly executable from storage on the target system.

28. The method of claim 18 wherein the host-linked module comprises information of closed set loaded and linked classes.

29. The method of claim 18 wherein the host-linked module provides re-use of the loading and the linking steps in multiple executions of an application having access to the target-linked module.

30. The method of claim 29 wherein the host system resolves module references during generation of the host-linked module.

31. The method of claim 30 wherein the host-linked module being provided to the target system eliminates need for the target system to resolve classes associated with the host-linked module.

32. The method of claim 18 wherein the host-linked module provides re-use of the loading and the linking steps in multiple executions of an application and of a second application.

33. The method of claim 18 wherein the host-linked module is generated prior to execution of an application.

34. The method of claim 18 wherein the host-linked module is configured based upon code communication to the target system.

35. The method of claim 18 wherein the host-linked module is configured based upon code set up at execution time.

36. The method of claim 18 further comprising the step of: providing the host-linked module to the target system for use by an application.

37. The method of claim 18 further comprising the step of: transmitting the host-linked module from the host system to the target system over the network connection which comprises a mobile communication network for use by an application.

38. The method of claim 18 further comprising the step of: dividing processing machine runtime between the host system and the target system by forming at the host system the host-linked module and by linking at the target system the host-linked module into at least one target-linked module for use by an application.

39. The method of claim 18 further comprising the step of: linking at the target system the host-linked module with other modules for use by an application.

40. The method of claim 39 further comprising the step of: providing a table of exported identifiers for use in the linking of the loaded classes at the host system.

41. The method of claim 18 wherein the target system comprises a bandwidth-limited device.

42. The method of claim 18 wherein the target system comprises a processing machine for executing an application.

43. The method of claim 18 wherein the target system comprises a virtual machine for executing an application.

44. The method of claim 18 wherein the target system comprises a mobile data device.

45. The method of claim 18 wherein the target system comprises a personal data assistant.

46. The method of claim 18 wherein the target system comprises an appliance.

47. The method of claim 18 wherein the target system comprises a thin client application.

48. The method of claim 18 wherein the target system comprises a virtual machine code processor to process the host-linked module.

49. The method of claim 18 wherein the target system comprises a hardware processing machine runtime to process the host-linked module.

50. The method of claim 18 wherein the classes comprise Java-based classes.

51. Computer software stored on a processor-readable media, the computer software comprising program code for carrying out a method according to claim 18.

52. A host-linked module produced in accordance with the method of claim 18.

53. A method of handling a host-linked module at a target system, said host-linked module having been generated by a host system through loading at least several classes, said host system linking at the host system the loaded classes and forming at least one host-linked module from the linked classes, said method comprising:
    receiving the host-linked module, which has multiple pre-linked classes, at the target system from the host system over a network connection, wherein the host system split class run-time processing between the host system and the target system by providing the multiple pre-linked classes over a network connection;

determining whether any additional classes are to be linked with the host-linked module, if additional classes are to be linked, then linking the host-linked module with the additional classes to form a target-linked module;

storing said target-linked module in a processor-readable medium; and accessing the target-linked module in order to enable the target-linked module to be used by an application operating on the target system.

54. The method of claim 53 wherein the host-linked module being provided to the target system eliminates the target system from resolving classes associated with the host-linked module.

55. The method of claim 53 wherein the host-linked module being provided to the target system eliminates need for the target system to resolve classes associated with the host-linked module.

56. The method of claim 53 wherein the target system comprises a bandwidth-limited device.

57. The method of claim 53 wherein the target system comprises a processing machine for executing the application.

58. The method of claim 53 wherein the target system comprises a virtual machine for executing the application.

59. The method of claim 53 wherein the target system comprises a mobile data device.

60. The method of claim 53 wherein the target system comprises a personal data assistant.

61. The method of claim 53 wherein the target system comprises an appliance.

62. The method of claim 53 wherein the target system comprises a thin client application.

63. The method of claim 53 wherein the target system comprises a virtual machine code processor to process the host-linked module.

64. The method of claim 53 wherein the target system comprises a hardware processing machine runtime to process the host-linked module.

65. The method of claim 53 wherein the classes comprise Java-based classes.

66. Computer software stored on a processor-readable media, the computer software comprising program code for carrying out a method according to claim 53.

67. The method of claim 53 wherein the host-linked module was verified at the host system using sanity checks once prior to multiple executions on the target system.

68. The method of claim 53 wherein the host-linked module comprises a plurality of modules that contain all classes needed by the application.

69. The method of claim 53 wherein the host-linked module is directly executable from storage on the target system.

70. The method of claim 53 wherein the host-linked module provides re-use of the loading and the linking steps in multiple executions of the application.

71. The method of claim 70 wherein the host system resolves module references during generation of the host-linked module.

72. The method of claim 53 wherein the host-linked module provides re-use of the loading and the linking steps in multiple executions of the application and of a second application.

73. The method of claim 53 wherein the host-linked module is generated prior to execution of the application.

74. The method of claim 53 wherein the host-linked module is configured based upon code communication to the target system.

75. The method of claim 53 wherein the host-linked module is configured based upon code set up at execution time.

76. The method of claim 53 further comprising the step of: receiving the host-linked module from the host system at the target system over the network connection which comprises a mobile communication network.

77. The method of claim 53 further comprising the step of: dividing processing machine runtime between the host system and the target system by forming the host-linked module at the host system and by target-linking at the target system the host-linked module into at least one target-linked module for use by the application.

78. A module-based runtime system for executing an application, comprising:

a processor-readable memory storing a pre-linked module that includes class files that have been loaded and linked, said pre-linked module having information of closed set loaded and linked classes, said pre-linked module, which has multiple pre-linked classes, being provided to a target system over a network connection, wherein a host system splits class run-time processing between the host system and the target system by providing the multiple pre-linked classes over a network connection;

the target system configured to link the pre-linked module into a target-linked module and including an application that accesses the target-linked module to use the classes during the application's execution.

79. A non-transitory processor-readable memory for storing a host-linked module for use by a target system, said host-linked module being generated through a process comprising the steps of:

loading at the host system at least several classes;

linking at the host system the loaded classes; and forming at least one host-linked module from the linked classes, wherein the host-linked module having multiple pre-linked classes is made available over a network connection for use by the target system for linking to a target-linked module.

80. The method of claim 38 further comprising:

executing said application on said target system;

requesting a new pre-linked module from said host system at said target system by said application;

creating said new pre-linked module by said host system in response to said request;

transmitting said new pre-linked module to said target system over said network connection from said host system; and continuing execution of said application on said target system using said new pre-linked module.

* * * * *

UNITED STATES PATENT AND TRADEMARK OFFICE
CERTIFICATE OF CORRECTION

PATENT NO. : 8,627,316 B2
APPLICATION NO. : 12/372233
DATED : January 7, 2014
INVENTOR(S) : David P. Yach et al.

Page 1 of 1

It is certified that error appears in the above-identified patent and that said Letters Patent is hereby corrected as shown below:

In the Claims:

Column 9, line 24, In Claim 18, delete "use" and insert -- use by --, therefor.

Signed and Sealed this
Thirteenth Day of May, 2014

Michelle K. Lee
*Deputy Director of the United States Patent and Trademark Office*